United States Patent
Duffy

(10) Patent No.: US 9,939,051 B2
(45) Date of Patent: Apr. 10, 2018

(54) MAGNETIC STOP FOR MOVING COMPONENTS

(71) Applicant: Schaeffler Technologies AG & Co. KG, Herzogenaurach (DE)

(72) Inventor: Ryan Duffy, Royal Oak, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/205,245

(22) Filed: Jul. 8, 2016

(65) Prior Publication Data

US 2018/0010669 A1    Jan. 11, 2018

(51) Int. Cl.
*F16H 7/10* (2006.01)
*F16H 7/12* (2006.01)
*F16H 7/08* (2006.01)

(52) U.S. Cl.
CPC ......... *F16H 7/1209* (2013.01); *F16H 7/0829* (2013.01); *F16H 2007/0865* (2013.01); *F16H 2007/0893* (2013.01)

(58) Field of Classification Search
CPC ............. F16H 2007/081; F16H 7/1281; F16H 2007/0861; F02B 67/06; F01L 1/024
USPC ......................................... 474/112, 133, 135
See application file for complete search history.

(56) References Cited

U.S. PATENT DOCUMENTS

2014/0246476 A1    9/2014  Hall et al.

*Primary Examiner* — Henry Y Liu
(74) *Attorney, Agent, or Firm* — Volpe and Koenig, P.C.

(57) ABSTRACT

A tensioning system including a magnetic stop is provided. The tensioning system includes a tensioner arm and a support. The tensioner arm is mounted on the support for pivoting movement. The support includes a support magnetic or ferromagnetic element on at least a first surface thereof. The tensioner arm includes a tensioner arm magnet on at least a second surface thereof that faces the first surface of the support.

11 Claims, 7 Drawing Sheets

MAGNETIC STOP FOR MOVING COMPONENTS

FIELD OF INVENTION

The present invention relates to a traction drive system and is more particularly related to a tensioning system for a traction drive system.

BACKGROUND

Traction drive systems are used in a variety of applications. One type of traction drive system includes a belt or chain that extends endlessly between pulleys or gears. The system further includes a tensioning system with a tensioner arm for adjusting the tension of the belt or chain, for example, as shown in FIGS. 1A and 1B which illustrate a tensioning system 10 according to the prior art. As shown in FIG. 1A, the traction drive system includes an endless belt 15 which is tensioned via the tensioning system 10 which includes a tensioner arm 20 mounted to a support 40. The tensioner arm 20 is arranged on the support 40 such that the tensioner arm 20 pivots about a pivot point 22 so that the idler wheel or the tensioner arm 20 is pressed into the belt 15 in order to adjust the tension. An actuator 60 is fixed to a portion of the tensioner arm 20 and applies a force on the tensioner arm 20 to pivot the tensioner arm 20 and adjust tension of the belt 15. The actuator 60 can be a simple spring actuator, a pressurized cylinder, or other force generating element During operation, rotation of the belt 15 may cause the tensioner arm 20 to vibrate or otherwise contact the support 40 which results in undesirable wear and audible chatter. One known solution for addressing this contact is to install a rubber stopper 30 between opposing faces of the tensioner arm 20 and the support 40, as shown in FIG. 1B. While this known rubber stopper 30 reduces wear between the tensioner arm 20 and the support 40, chatter is still produced due to contact between the rubber stopper 30 and the support 40. It would be desirable to provide an improved tensioning system that prevents contact between the tensioning arm and the support or provides guidance for the tensioning arm, and also eliminates chatter.

SUMMARY

A tensioning system including a magnetic stop that eliminates contact between a tensioner arm and a support is provided. The tensioner arm is mounted on the support for pivoting movement, and the support includes a support magnetic or ferromagnetic element on at least a first surface thereof. The tensioner arm includes a tensioner arm magnet on at least a second surface thereof that faces the first surface of the support. The support magnetic or ferromagnetic element and the tensioner arm magnet provide an attractive or repulsive force between the support and the tensioner arm which prevents chatter between the support and the tensioner arm.

In a first embodiment, the support magnetic or ferromagnetic element is a support magnet having a first polar orientation that is arranged relative to a polar orientation of the tensioner arm magnet such that the support magnet and the tensioner arm magnet are attracted to one another. In this embodiment, the tensioner arm and the support are attracted to one another and the magnets provide an attractive force for alignment with one another which also prevents chatter between the contact arm and the support during operation.

In a second embodiment, the support magnetic or ferromagnetic element is a support magnet having a first polar orientation that is arranged relative to a polar orientation of the second magnet such that the support magnet and the tensioner arm magnet repel one another. In this embodiment, the tensioner arm and the support are repelled from one another and a repulsive force between the magnets prevents contact or chatter between the contact arm and the support during operation.

BRIEF DESCRIPTION OF THE DRAWINGS

The foregoing Summary and the following detailed description will be better understood when read in conjunction with the appended drawings, which illustrate a preferred embodiment of the invention. In the drawings.

DETAILED DESCRIPTION OF THE PREFERRED EMBODIMENTS

Figure 1A:
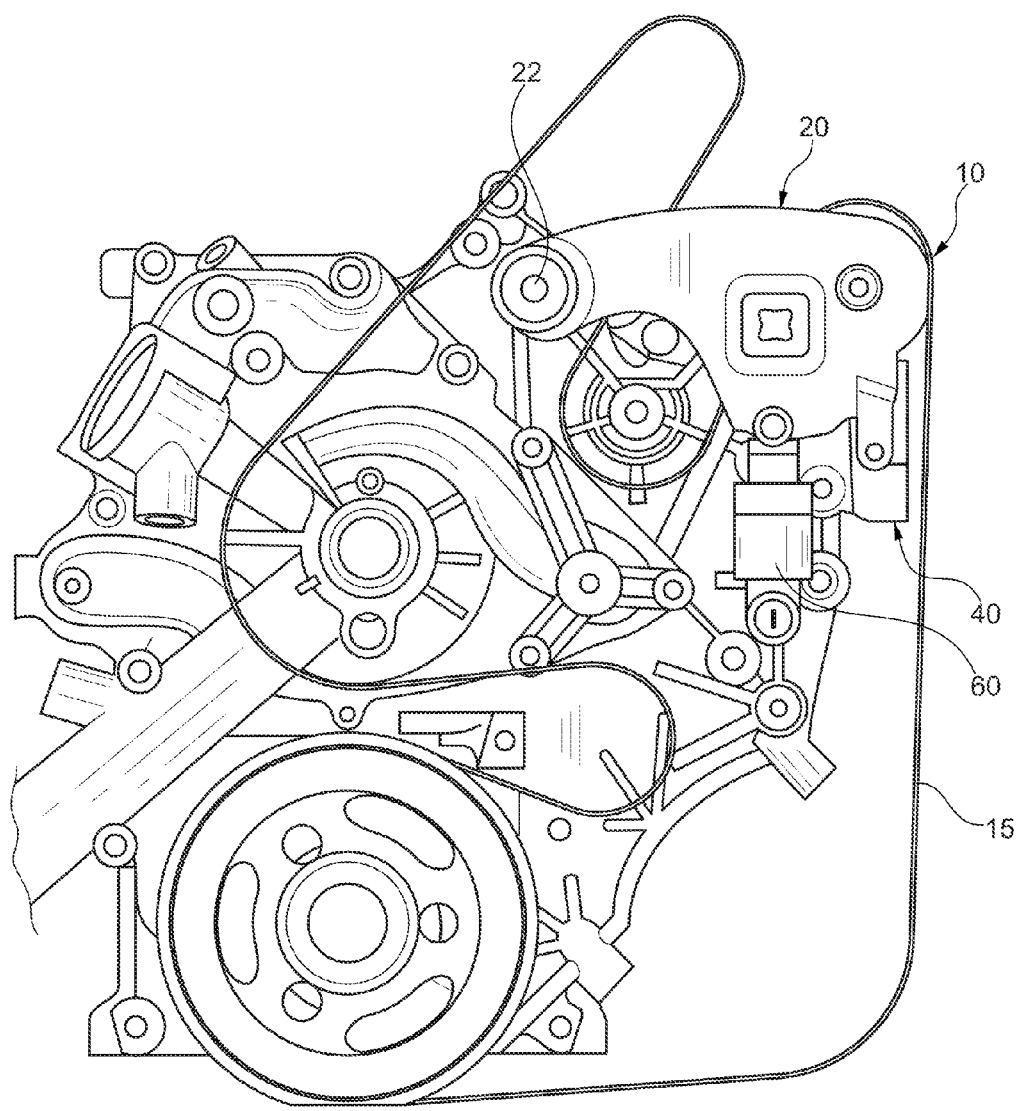
FIG. 1A is a front view of a tensioning system according to the prior art.
Figure 1B:
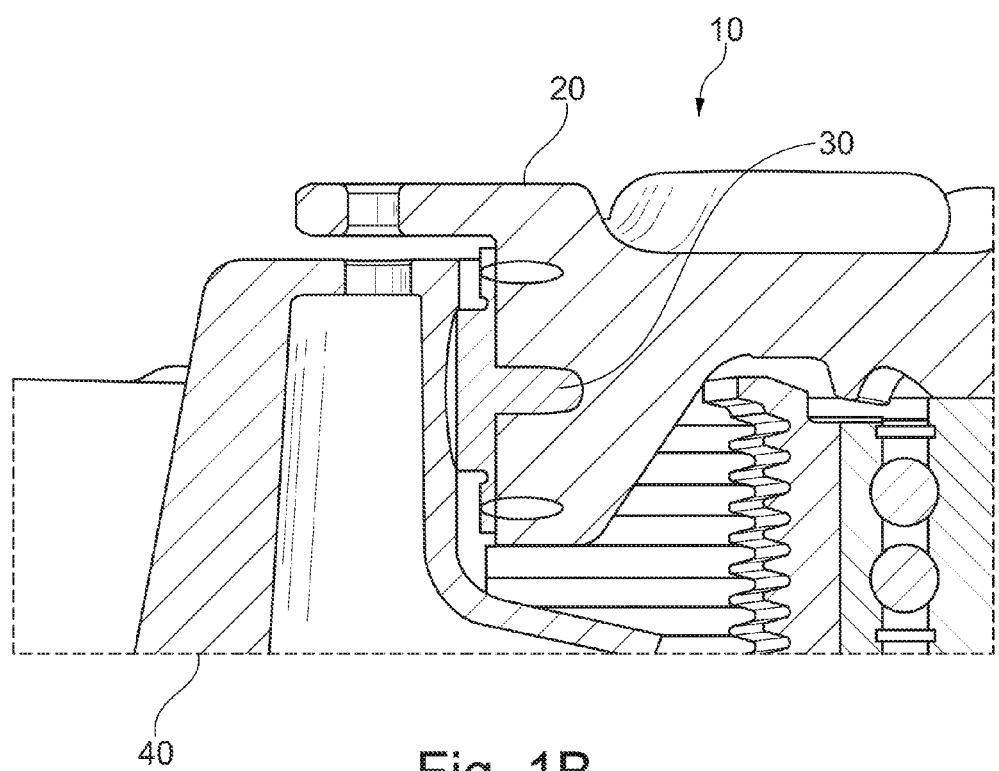
FIG. 1B is a magnified cross section view of a tensioner arm and a support of the tensioning system of FIG. 1A.

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. "Axially" refers to a direction along the axis of a shaft. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Figure 2A:
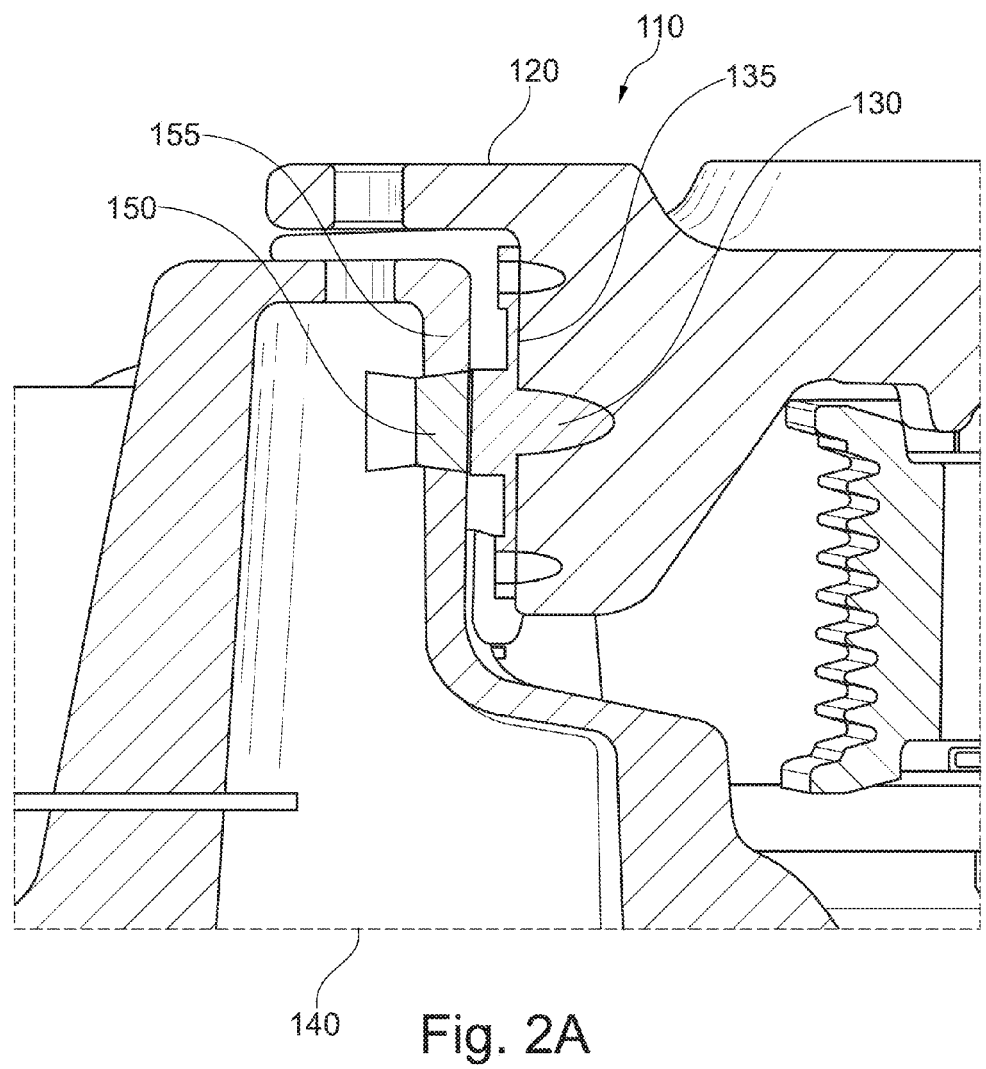
FIG. 2A is a cross section view of a tensioner arm and a support of a tensioning system according to a first embodiment of the present invention.
Figure 2B:
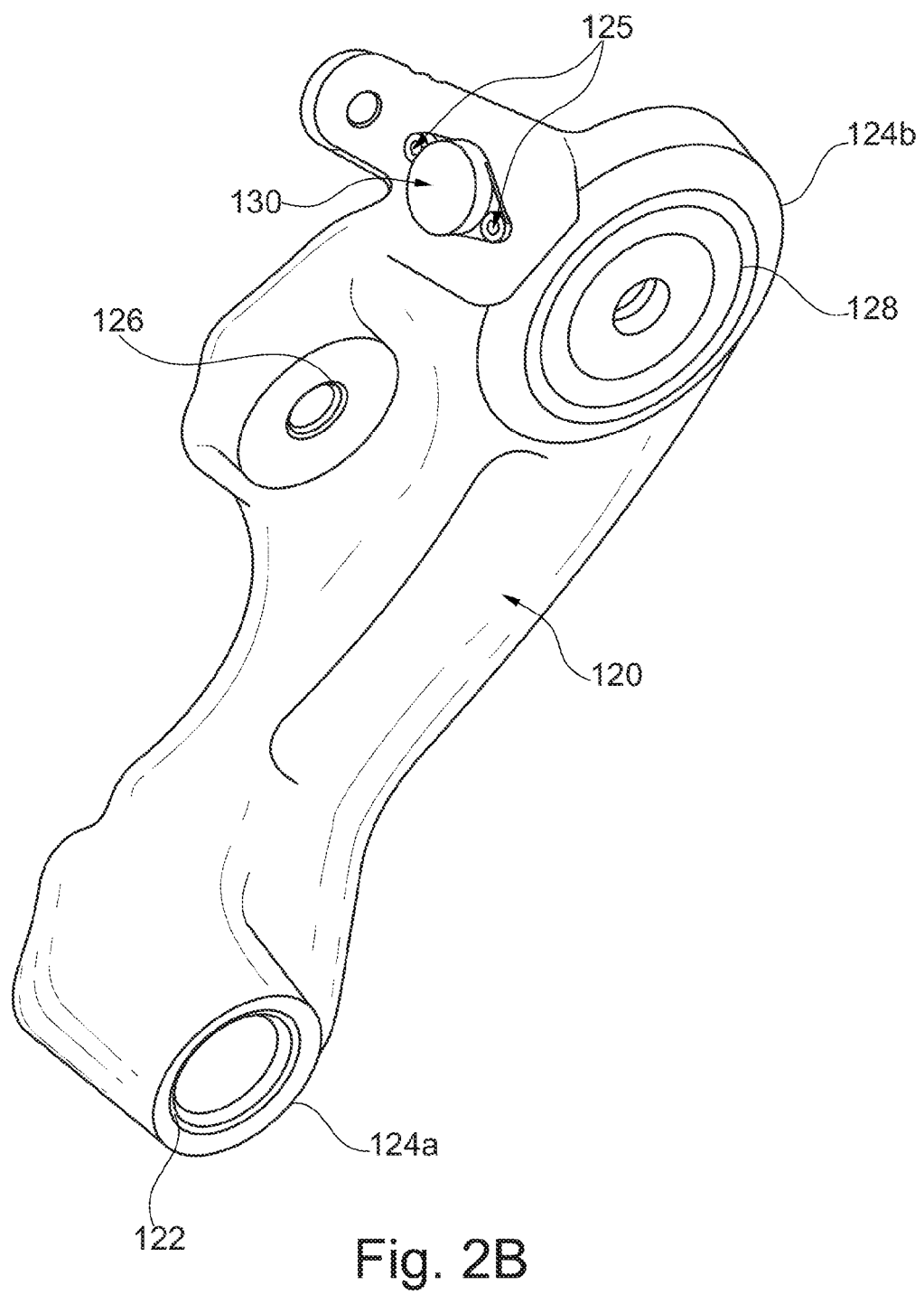
FIG. 2B is a perspective view of the tensioner arm of FIG. 2A.

Referring to FIG. 2A, a first embodiment of a tensioning system 110 is illustrated including a tensioner arm 120 and a support 140. The tensioner arm 120 is mounted on the support 140 for pivoting movement. The tensioner arm 120 is preferably formed from aluminum. As shown in FIG. 2B, the tensioner arm 120 further includes a mounting region 122 at a pivot end 124a where the tensioner arm 120 is mounted to the support 140 and about which the tensioner arm 120 pivots. The tensioner arm 120 includes an actuation region 126 configured to engage an actuator that adjusts a position of the tensioner arm 120. The tensioner arm 120 includes a pulley support region 128 configured to support a pulley on which a belt or chain is guided.

As shown in FIG. 2A, the support 140 includes a support magnetic or ferromagnetic element 150 on at least a first surface 155 thereof. The term "ferromagnetic element" as used in the present application refers to an element having a high susceptibility to magnetism, e.g. iron. The tensioner arm 120 includes a tensioner arm magnet 130 on at least a second surface 135 thereof that faces the first surface 155 of the support 140. As shown in FIG. 2B, the tensioner arm magnet 130 is preferably arranged at a distal end 124b of the tensioner arm 120 from the pivot end 124a. The tensioner arm magnet 130 is preferably fixed to the tensioner arm 120 by fasteners 125. One of ordinary skill in the art would recognize from the present disclosure that an alternative fastening configuration could be used.

Figure 3:
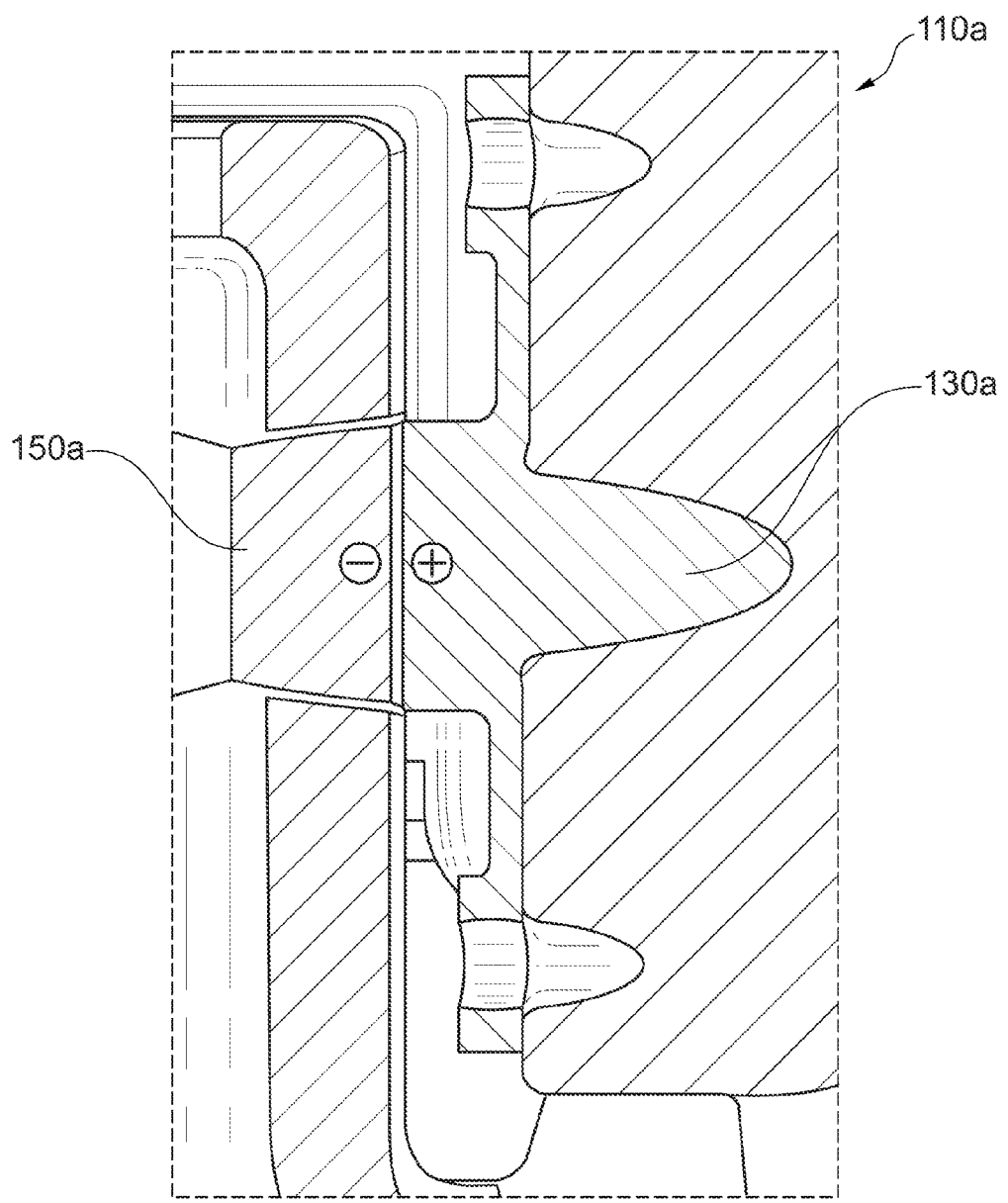
FIG. 3 is a cross section view of a tensioner arm and a support of a tensioning system according to a second embodiment of the present invention.

In a second embodiment of the tensioning system 110a illustrated in FIG. 3, the support magnetic or ferromagnetic element 150 is a support magnet 150a having a first polar orientation that is arranged relative to a polar orientation of the tensioner arm magnet 130a such that the support magnet 150a and the tensioner arm magnet 130a are attracted to one another. As shown by representative symbols in FIG. 3, the support magnet 150a has a negative polarity orientation facing the tensioner arm magnet 130a, and the tensioner arm magnet 130a has a positive polarity portion facing the support magnet 150a. One of ordinary skill in the art would recognize from the present disclosure that the polarities could be reversed, while maintaining an opposing orientation of the polarities of the two magnets. This arrangement provides a semi-fixed positioning of the tensioner arm 120 relative to the support 140 once the magnets 130a, 150a are aligned in addition to helping eliminate chatter between the tensioner arm 120 and the support 140. In this embodiment, the magnetic force helps guide the tensioner arm 120 to a respective position relative to the support 140, and maintains the position of the tensioner arm 120 relative to the support 140.

Figure 4:
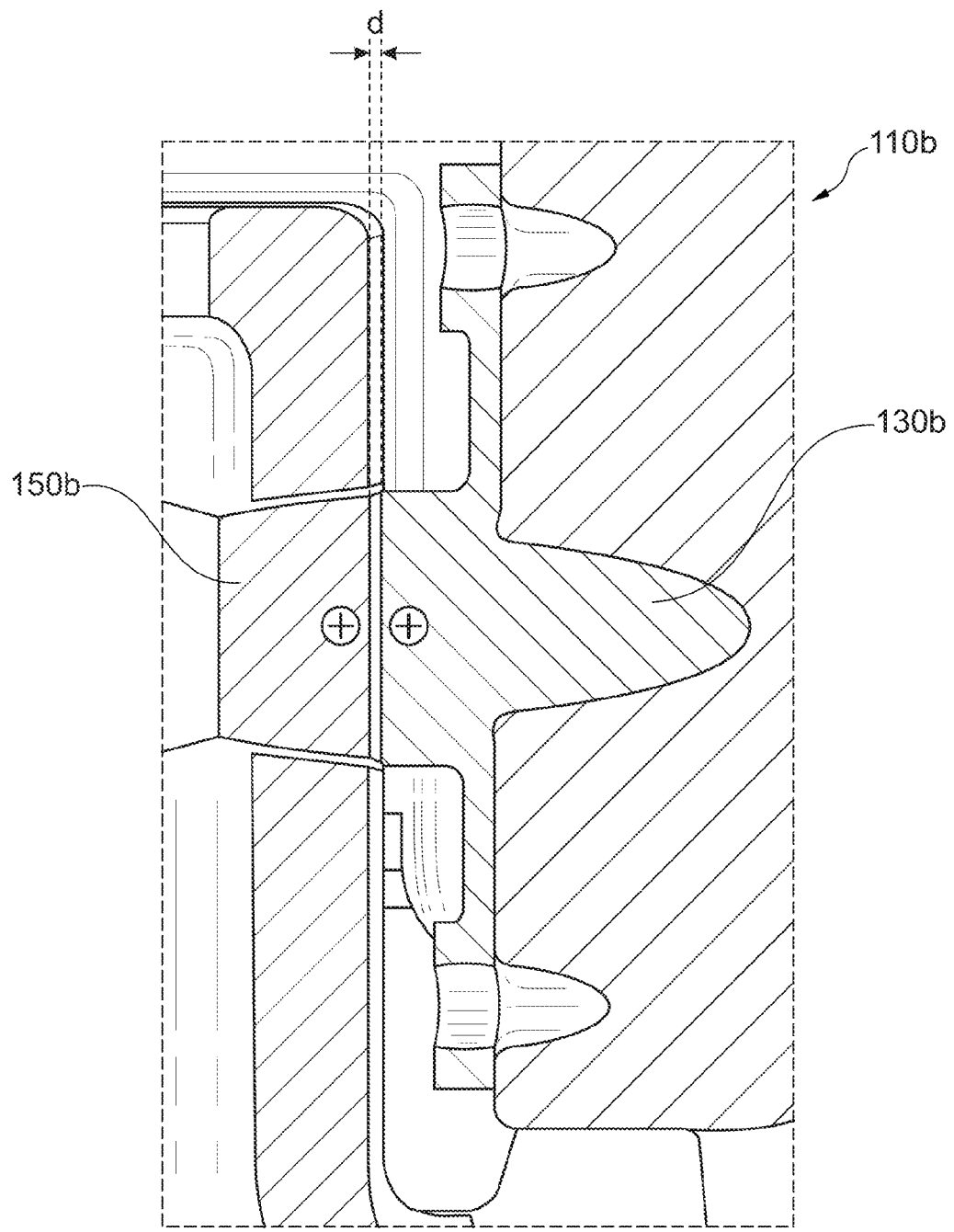
FIG. 4 is a cross section view of a tensioner arm and a support of a tensioning system according to a third embodiment of the present invention.

In a third embodiment of the tensioning system 110b illustrated in FIG. 4, the support magnetic or ferromagnetic element 150 is a support magnet 150b having a first polar orientation that is positioned relative to a polar orientation of the tensioner arm magnet 130b such that the support magnet 150b and the tensioner arm magnet 130b repel one another. As shown by representative symbols in FIG. 4, the tensioner arm magnet 130b and the support magnet 150b each have a positive polarity facing one another. One of ordinary skill in the art would recognize from the present disclosure that the polarities can both be negative while maintaining an opposing orientation of the polarities of the two facing magnets. As shown in FIG. 4, a gap (d) is defined between the support magnetic or ferromagnetic element 150b and the tensioner arm magnet 130b. The gap (d) is preferably 0.4 mm-0.6 mm, and is more preferably 0.5 mm. Although this gap is only shown in FIG. 4, one of ordinary skill in the art would recognize from the present application that a similar gap can be provided for the embodiments shown in FIGS. 2A, 2B, 3, and 5.

Figure 5:
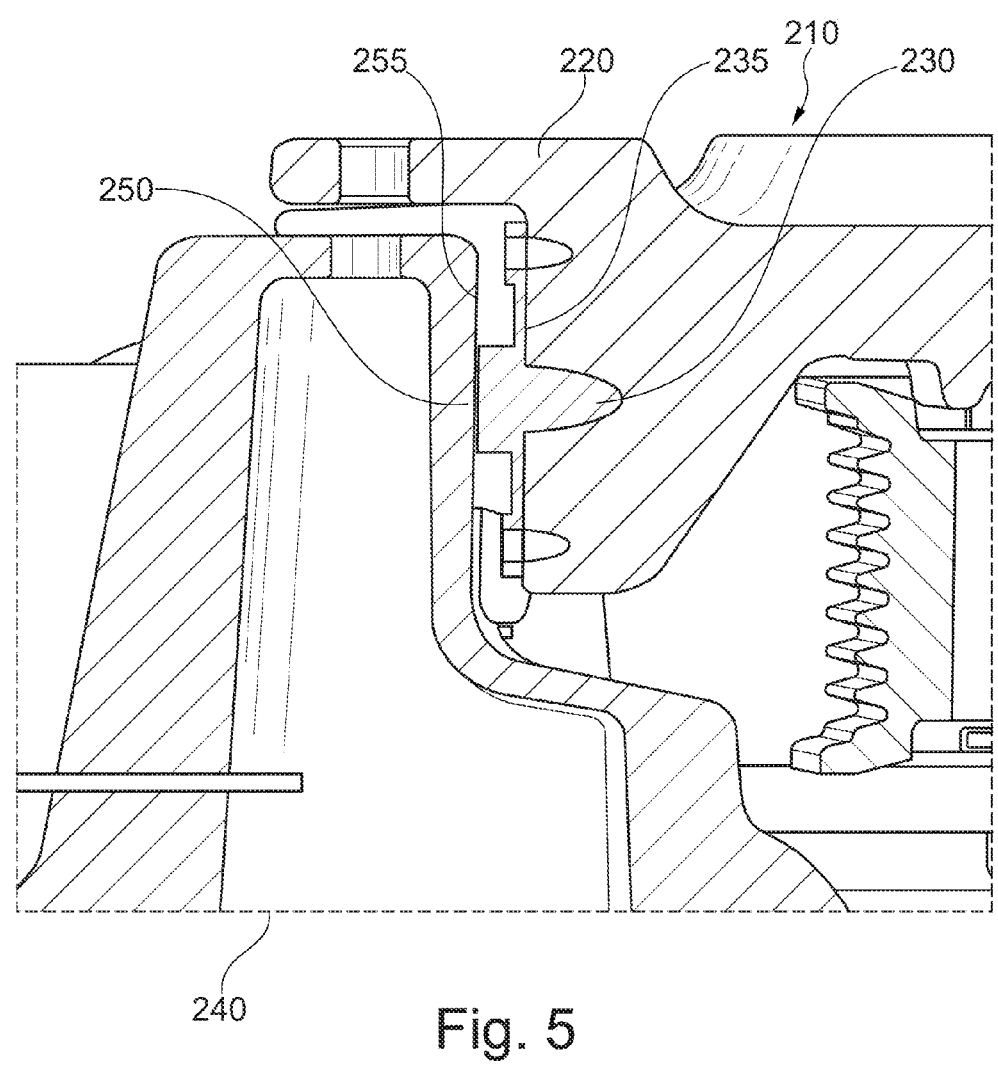
FIG. 5 is a cross section view of a tensioner arm and a support of a tensioning system according to a fourth embodiment of the present invention.

In a fourth embodiment of the tensioning system 210 illustrated in FIG. 5, the support 240 does not include a magnet, and the support 240 instead includes a ferromagnetic region 250 on a first surface 255 facing the tensioner arm 220. The ferromagnetic region 250 is formed from a material having a high susceptibility to magnetism, such as iron. The tensioner arm 220 includes a tensioner arm magnet 230 on a second surface 235 facing the first surface 255 of the support 240. The tensioner arm magnet 230 provides a magnetically attractive force for the ferromagnetic region 250 such that the tensioner arm 220 is maintained in a stable position with respect to the support 240.

Having thus described the present invention in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. A tensioning system, comprising:
a tensioner arm and a support, the tensioner arm being mounted on the support for pivoting movement, the support including a support magnetic or ferromagnetic element on at least a first surface thereof, the tensioner arm including a tensioner arm magnet on at least a second surface thereof that faces the first surface of the support, and (1) the support magnetic or ferromagnetic element and (2) the tensioner arm magnet magnetically interact with each other to adjust a position of the tensioner arm relative to the support.

2. The tensioning system of claim 1, wherein the support magnetic or ferromagnetic element is a support magnet having a first polar orientation that is arranged relative to a polar orientation of the tensioner arm magnet such that the support magnet and the tensioner arm magnet are attracted to one another.

3. The tensioning system of claim 1, wherein the support magnetic or ferromagnetic element is a support magnet having a first polar orientation that is arranged relative to a polar orientation of the tensioner arm magnet such that the support magnet and the tensioner arm magnet repel one another.

4. The tensioning system of claim 1, wherein a gap defined between the support magnetic or ferromagnetic element and the tensioner arm magnet is 0.4 mm-0.6 mm.

5. The tensioning system of claim 1, wherein a gap defined between the support magnetic or ferromagnetic element and the tensioner arm magnet is 0.5 mm.

6. A tensioning system, comprising:
a tensioner arm and a support, the tensioner arm being mounted on the support for pivoting movement, the support including a support magnetic or ferromagnetic element on at least a first surface thereof, and the tensioner arm including a tensioner arm magnet on at least a second surface thereof that faces the first surface of the support, wherein the tensioner arm further includes a mounting region at a pivot end where the tensioner arm is mounted to the support and about which the tensioner arm pivots, an actuation region configured to engage an actuator that adjusts a position of the tensioner arm, and a pulley support region configured to support a pulley on which a belt or chain is guided, and the tensioner arm magnet is arranged at a distal end of the tensioner arm from the pivot end.

7. The tensioning system of claim 1, wherein the tensioner arm magnet is fixed to the tensioner arm by fasteners.

8. The tensioning system of claim 1, wherein the tensioner arm is formed from aluminum.

9. The tensioning system of claim 1, wherein the support magnetic or ferromagnetic element is arranged on an axial end face of the support, and the tensioner arm magnet is arranged on an axial end face of the tensioner arm.

10. The tensioning system of claim 1, wherein the support magnetic or ferromagnetic element and the tensioner arm magnet overlap in an axial direction.

11. The tensioning system of claim 1, wherein the support magnetic or ferromagnetic element and the tensioner arm magnet form a magnetic stop.

* * * * *